United States Patent
Nguyen et al.

(10) Patent No.: US 6,263,909 B1
(45) Date of Patent: *Jul. 24, 2001

(54) VALVE ASSEMBLY

(76) Inventors: Van Doan Nguyen, Konrad-Duden-Weg 3, D-60437 Frankfurt; Yuejin Gong, Friedbergerstr. 35, D-61350 Bad Homburg; Randolf Körtge, Bartholomäus-Arnoldi-Str. 76a; Hans Jürgen Lauth, Franz-Schubert-Str. 2, both of D-61250 Usingen; Gerhard Overdiek, Gladiolenweg 15, D-61382 Friedrichsdorf; Willi Parsch, Bachgasse 18, D-64404 Bickenbach; Thomas Nied-Menninger, Landrat-Beckmann-Str. 41, D-61250 Usingen, all of (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/001,926

(22) Filed: Dec. 31, 1997

Related U.S. Application Data

(63) Continuation of application No. 08/250,404, filed on May 27, 1994, now abandoned.

(30) Foreign Application Priority Data

May 28, 1993 (DE) .................................................. 43 17 880
Oct. 16, 1993 (DE) .................................................. 43 35 377

(51) Int. Cl.[7] .................................................. F16K 31/12
(52) U.S. Cl. .......................................... 137/491; 137/489
(58) Field of Search .................................... 137/491, 489

(56) References Cited

U.S. PATENT DOCUMENTS

| | | |
|---|---|---|
| 3,195,556 | 7/1965 | Norstrud et al. . |
| 3,314,495 | 4/1967 | Clark et al. . |
| 3,512,550 | 5/1970 | Ammann . |
| 3,752,174 * | 8/1973 | Turolla .................................. 137/491 |
| 4,231,393 * | 11/1980 | Byfuglien ............................. 137/491 |
| 4,311,161 | 1/1982 | Narumi . |
| 4,361,166 | 11/1982 | Honaga et al. . |
| 4,476,890 * | 10/1984 | Kawasaki et al. .................... 137/491 |
| 4,548,231 * | 10/1985 | Schwede .............................. 137/491 |
| 4,860,788 * | 8/1989 | Asaoka ................................. 137/491 |
| 5,460,198 * | 10/1995 | Kortge ................................. 137/491 |

FOREIGN PATENT DOCUMENTS

| | | |
|---|---|---|
| 886990 | 8/1953 | (DE) . |
| 3447484 | 7/1986 | (DE) . |
| 0400152 | 12/1990 | (EP) . |
| 1135029 | 4/1957 | (FR) . |
| 2425005 | 11/1979 | (FR) . |

* cited by examiner

Primary Examiner—Denise L. Ferensic
Assistant Examiner—Joanne Y. Kim

(57) ABSTRACT

A valve assembly for a hydraulic discharge device and including a piston displaceable in a bore of a housing of the discharge device against a biasing force and having an outer surface, which sealingly engages an inner wall of the housing bore and blocks a channel opening into the bore so that the piston functions as a slide valve for this channel, the valve assembly further including a valve seat which, together with the piston, forms a seated valve.

14 Claims, 4 Drawing Sheets

VALVE ASSEMBLY

RELATED APPLICATIONS

This application is a continuation of application Ser. No. 08/250,404, filed May 27, 1994 now abandoned.

BACKGROUND OF THE INVENTION

The present invention relates to a valve assembly for a hydraulic discharge device and including a piston displaceable in a bore of a housing of the discharge device against a biasing force and having an outer surface, which sealingly engages an inner wall of the housing bore and blocks a channel opening into the bore so that the piston functions as a slide valve for this channel.

The valve assembly of this type are used, e.g., for controlling fluid flow from the discharge device to an actuator. The drawback of the valve assembly of this type consists in that a leakage of pressure fluid between the engageable surfaces of the piston and the bore wall exists. Therefore, the discharge device should always provide an additional amount of fluid flow to compensate for this leakage.

Accordingly, an object of the invention is a valve assembly of the above-mentioned type with improved sealing characteristics, which insure a good control stability of the slide valve.

SUMMARY OF THE INVENTION

This and other objects of the invention, which will become apparent thereafter, are achieved by providing a valve assembly of the above-mentioned type further comprising a valve seat which, together with the piston, form a seated valve, so that the piston functions, on one side, as a slide valve, and on the other side, as a seated valve. Such an arrangement insures the reduction of leakage to a minimum, without adversely affecting the control stability of the valve assembly.

Some of the preferred embodiments of the valve assembly according to the invention is characterized in that the piston, the outer surface of which sealingly engages the inner wall of the housing bore, has an outer edge which cooperates with a sealing surface extending at an angle to the inner wall, the sealing surface providing a valve seat for the piston. This arrangement provides very good sealing characteristics and reduces leakage to a minimum. The sealing surface, which may be, preferably, conical forms, in one of the embodiments of the inventive valve assembly, a part of a sealing ring inserted into the housing bore adjacent to a respective end face of the piston. Providing such a sealing ring results in a rather economical production of the valve assembly. Providing such a sealing ring insures an optimal protection against leakage losses.

In another preferred embodiment of the valve assembly according to the invention, the conical sealing surface forms part of a sealing sleeve received in the housing bore and the interior of which communicates with a pressure space of the housing bore which is supplied by pressure fluid through a channel having its mouth intersecting the bore wall in the region of the pressure space.

In yet another preferred embodiment of the invention, the piston has a conical end region the outer surface of which forms with an edge of an annular valve seat a seated valve arrangement. The conical outer surface can be rather easily obtained during manufacturing of the piston because the piston is a rotationally symmetrical part. According to a more preferred variant of this embodiment, the annular valve seat is formed as an extension of a plug which closes the housing bore and forms a discharge throttle. Here, the valve seat is an integral part of the plug which can be secured in the housing bore by being screwed thereinto.

In another variant of this embodiment, an inner surface of the annular valve seat and the outer surface of the conical end portion of the piston form an annular space. The inner surface of the annular valve seat and the outer surface of the conical end portion of the piston can extend parallel to each other or at an angle to each other. By selecting the arrangement of the inner surface of the annular valve seat relative to the outer conical surface of the piston, it is achieved that, upon opening of the seated valve arrangement, the cross-section of the flow opening can be changed. The changing of the flow opening cross-section permits to further vary the flow characteristics of the valve assembly, in addition to varying them in accordance with path-dependent adjustment of the discharge throttle.

By varying the diameter of either or both of the inner surface of the seat and the outer surface of the conical end portion of the piston, a variable cross-section of the annular space therebetween in an axial direction can be obtained. This permits to control, in a simple and advantageous manner, in accordance with the throttle characteristic of the piston, the flow angle at which the oil flows into a channel leading to the region of lower pressure.

In an especially preferred embodiment, the piston serves as a control slide of a flow control valve, with the slide cooperating with the conical sealing surface. The flow control valve, in this case, is characterized, on one hand, by optimal sealing characteristics in the region of the seated valve arrangement, and on the other side, by good control characteristics of the slide which remain practically unchanged. Specifically, the smooth uniform control, which is provided by a slide valve, remains unchanged.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
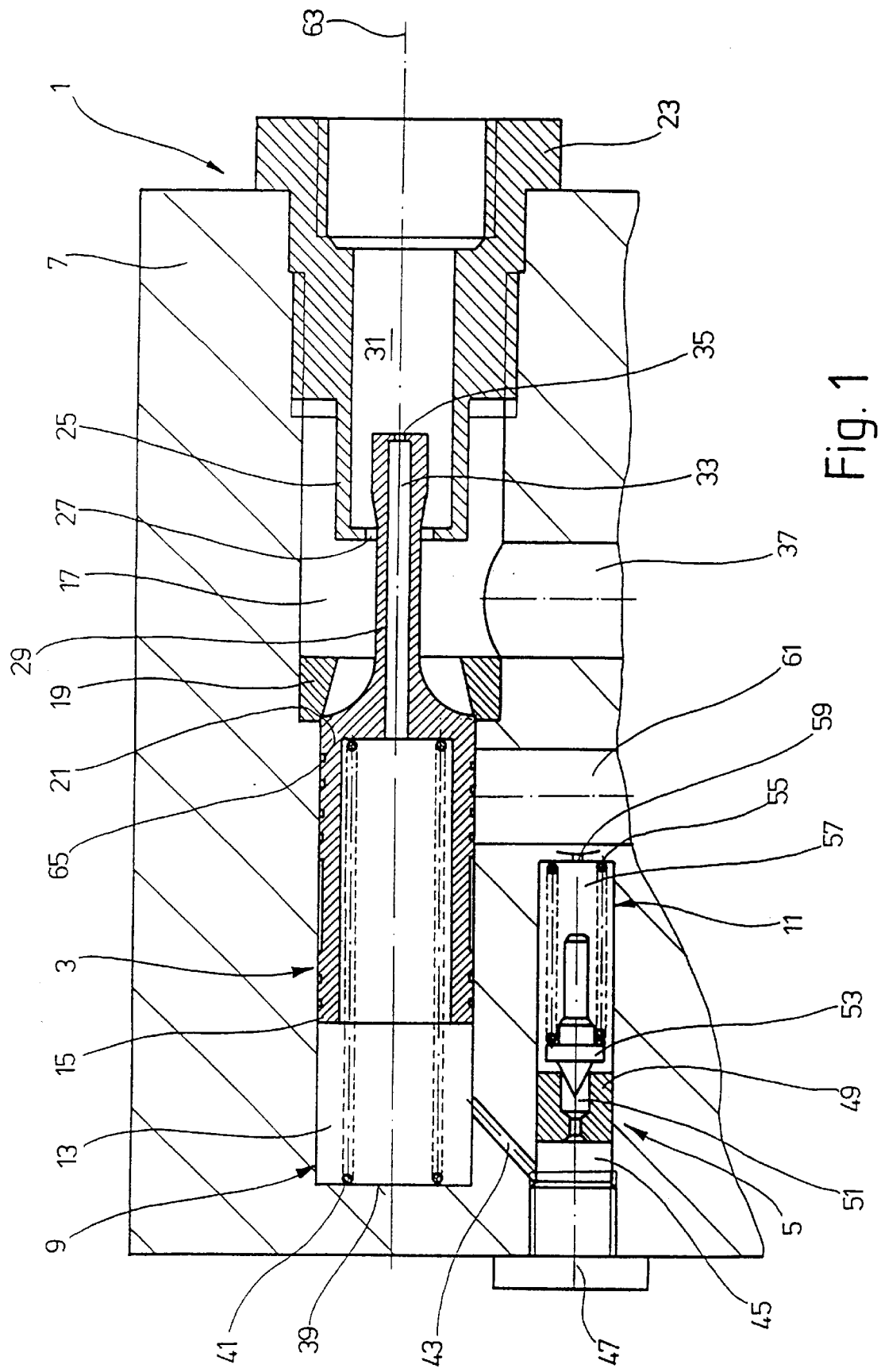
FIG. 1 is a longitudinal cross-sectional view of a first embodiment of the valve assembly according to the present invention.

The valve assembly 1 according to the present invention, which is shown in FIG. 1, comprises a flow control valve 3 and a pressure limiting valve 5. Both valves are located in two cavities formed in a housing 7 of the discharge device, e.g., in the housing of a steering pump. Both cavities are formed as blind bores. The first bore 9 is designated for receiving the flow control valve 3, and the second bore 11 is designated for receiving the pressure limiting valve 5.

The first bore 9 is formed as a stepped bore having a first portion 13 for receiving a piston 15 of the flow control valve 3, and a second portion 17 which has an inner diameter larger than the inner diameter of the first portion 13 and into which a ring 19 is pressed in. The ring 19 has a conical sealing surface 21. The conical surface 21 has a first region, the inner diameter of which is larger than the outer diameter of the piston 15, and a second region, the inner diameter of which is smaller than the outer diameter of the piston 15. The inner surface of the ring 19 can be arbitrary formed. The conical surface 21 is circular and in cross-section represents a portion of a conical surface having a cone angle, e.g., of about 45°, facing the piston 15. The inner surface of the ring 19 connected with the sealing surface 21 can also be made conical, as shown in FIG. 1, with a cone angle of about 10°–20° facing the piston 15.

The second portion 17 of the stepped bore 9 is closed with a connection plug 23. The connection plug 23 has a projection 25 extending inward of the second bore portion 17 and having an opening 27, through which a stem 29, projecting from the piston 15, extends into the interior 31 of the connecting plug 23. The stem 29 is provided with a through channel 33. An orifice 35, which is formed in the end face of a portion of the stem 29 located in the interior 31, provides for communication of the channel 33 with the interior 31. The cross-section of the orifice 35 is smaller than the cross-section of the channel 33. The connecting plug 23 is connected with an actuator, e.g., steering gear which thereby is connected with the discharge device, e.g., a steering pump.

A first channel 37, which is connected with the discharge side of the discharge device, that is the pressure side of the steering pump, opens into the second bore portion 17.

A spring element, e.g., a helical spring 41, which is supported on the bottom 39 of the first bore 9, acts on a left side of the piston 15 biasing the piston 15 to the right against the ring 19. The piston 15 is hollow so that the spring 41 is partially located in the interior of the piston 15. The length of the piston 15 is so selected that it does not close a channel 43, extending from the first bore portion 13, when it moves leftward against the biasing force of the spring 41. The channel 43 connects the first bore portion 13 with a first pressure chamber 45 in the second bore 11. The pressure chamber 45 is closed with a plug 47. At the opposite end, the pressure chamber 45 is closed with a valve 49 having a channel 57 closed with a closing body 53. A helical spring 55 biases from right to left the closing body 53 against the mouth of the channel 51. The closing body 53 separates the first pressure chamber 45 from a second pressure chamber 57. A channel 59 formed in the bottom of the second bore 11 communicates the second pressure chamber 57 with the reservoir of the discharge device.

The outer diameter of the piston 15 is so selected that it sealingly engages the inner surface of the first bore 9. The piston 15 sealing closes a second channel 61, which extends transverse to the central axis 63 of the first bore 9, and thereby prevents the channel from communicating with both the first bore portion 13 an the second bore portion 17 in the position of the piston 15 shown in FIG. 1. Thus, the piston 15 functions as a slide valve.

In the position of the piston 15 shown in FIG. 1, the piston 15 sealingly engages with its right annular edge 65, the conical sealing surface 21.

As it has already been discussed above, in the position of the piston 15 shown in FIG. 1 when it engages the ring 19, the stem 29 extends into the second bore portion 17.

The diameter of the stem 29 is smaller than that of the piston 15, and the stem 29 forms, together with the inner surface of the second bore portion 17, a pressure space communicating with the first channel 37. This pressure space communicates with the interior 31 of the connection plug 23 through the opening 27 through which the stem 29 extends. The portion of the stem 29, which is extendable through the opening 27 of the connection plug 23, has a sloping surface the diameter of which increases toward the end portion of the stem 29, with the maximum diameter of the sloping portion of the stem 29 being less than the diameter of the opening 27. Thus, upon the displacement of the piston 15, together with the stem 29, to the left, the annular space between the stem 29 and the wall of the opening 27.

The channel 33, which extends through the stem 29, connects the inner space 31 of the connection plug with the first bore portion 13 of the bore 9. As discussed previously, the channel 43 connects the first bore portion 13 with the first pressure chamber 45 of the pressure limiting valve 45. Thus, the right side of the piston 15 is subjected to a pressure force generated by the pressure in the second bore portion 17, and the left side of the piston 15 is subjected to a pressure force generated by the pressure in the first bore portion 13.

Figure 2:
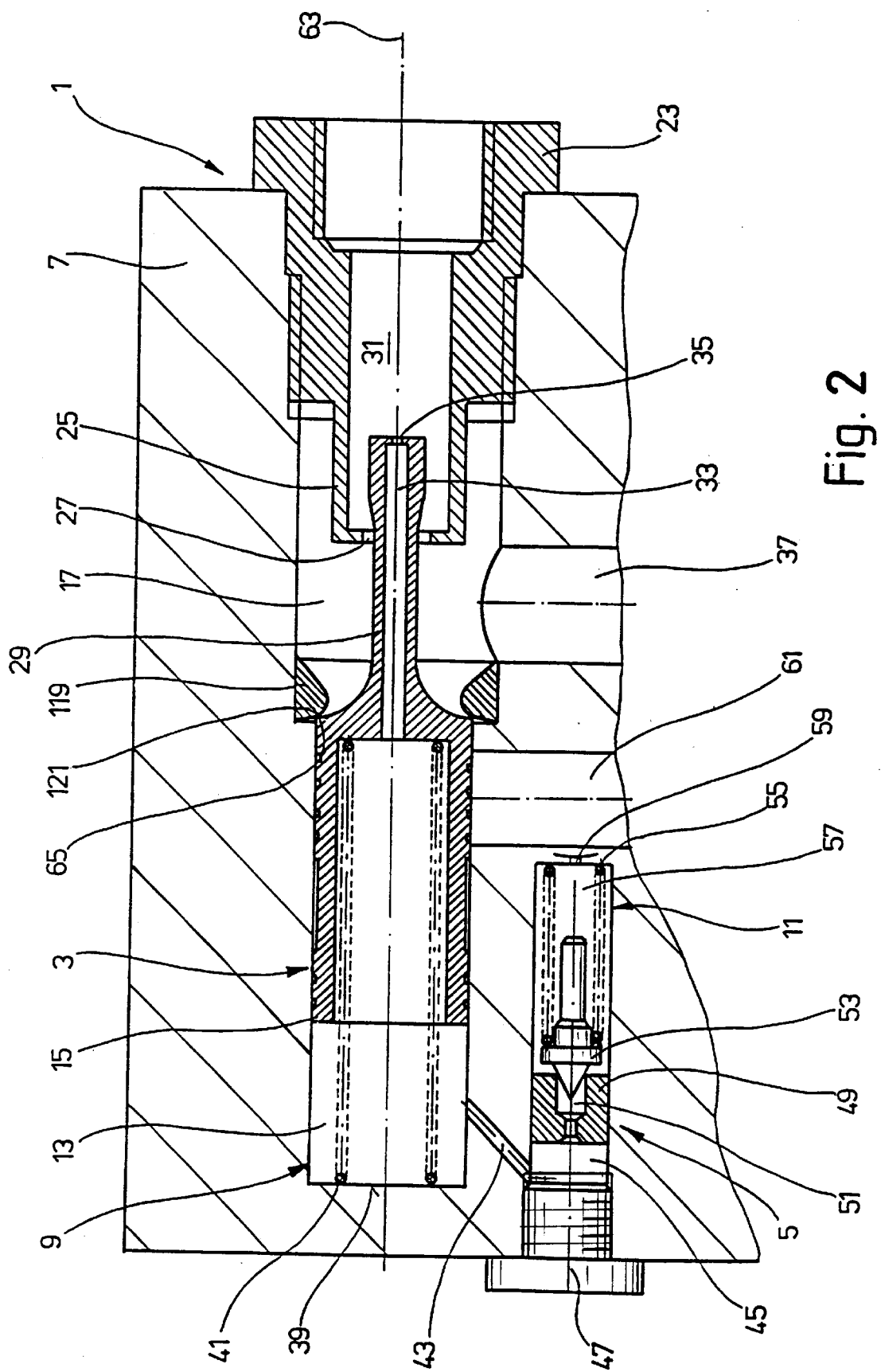
FIG. 2 is a longitudinal cross-sectional view of a second embodiment of the valve assembly according to the present invention.

FIG. 2 shows another embodiment of the valve assembly according to the present invention, which differs from the embodiment shown in FIG. 1 by the shape of the ring 119 forming a valve seat for the piston 15. In FIG. 2, identical elements are designated with the same reference numerals. The cross-section of the ring 119 is so selected that, on one side, it is provided with a sealing surface 121, which corresponds to the sealing surface 21 of the ring 19 in FIG. 1, and on the other side, it has a funnel facing the second bore portion 17. Such cross-section of the ring 119 provides for flow of a large amount of fluid between the discharge and suction sides of the discharge device when the flow control valve 3 establishes communication between the first channel 37 and the second channel 61.

Figure 3:
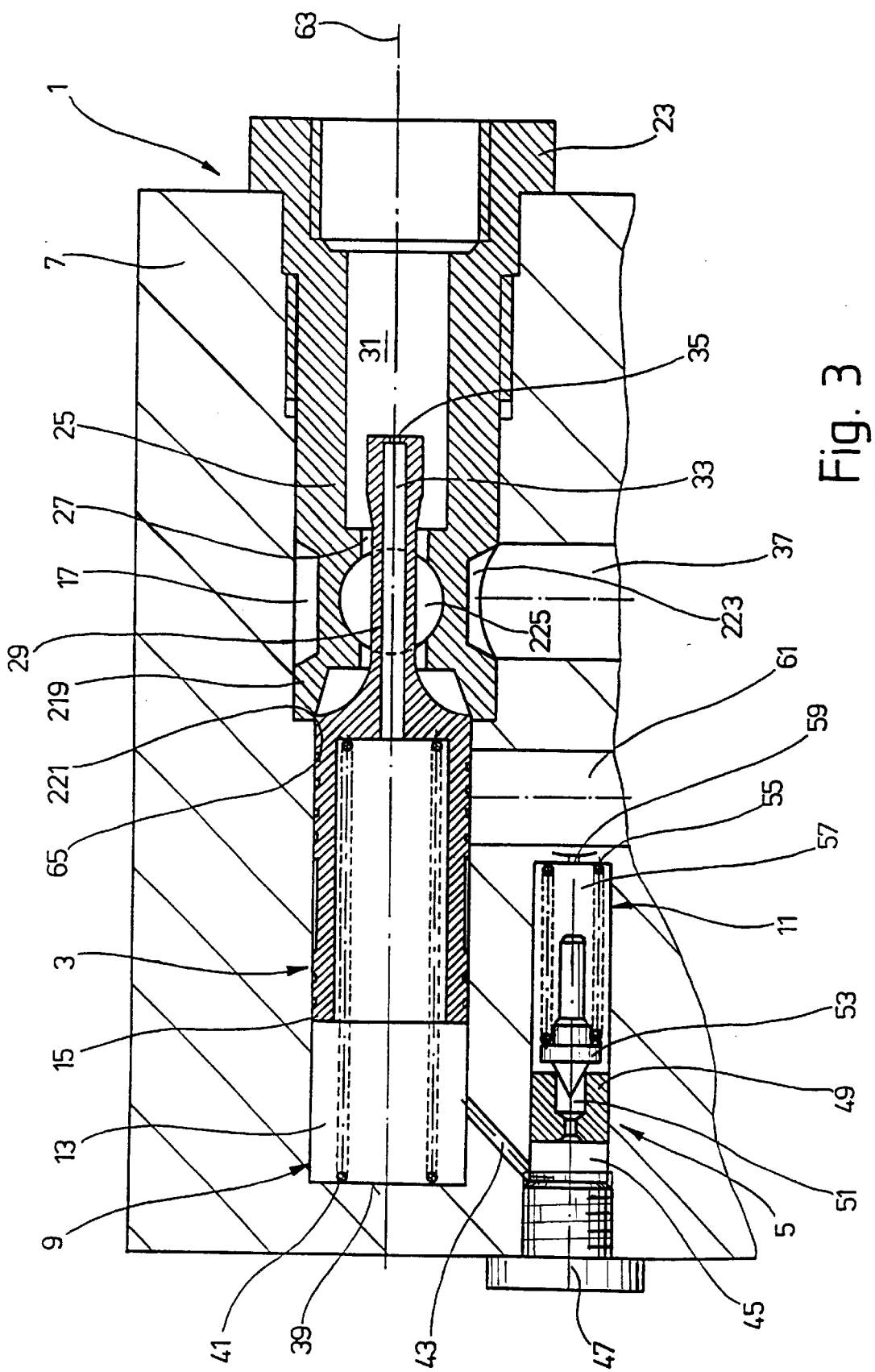
FIG. 3 is a longitudinal cross-sectional view of a third embodiment of the valve assembly according to the present invention.

FIG. 3 shows a third embodiment of the valve assembly according to the present invention, which distinguishes from the first two embodiments by how a seated valve is formed. In FIG. 3, the elements, identical with those of FIGS. 1 and 2, are designated with the same reference numerals.

In the embodiment of the valve assembly shown in FIG. 3, there is provided a valve seat comprising a sleeve 219 extending from the connection plug 23 to the outer edge 65 of the piston 15 and having, in the engagement region with the outer edge 65, a sealing surface 221. The sleeve 219 can be formed as one piece with the connection plug 23 or be formed as a separate part. The sleeve 219 has, in the region of the mouth of the first channel 37, an annular groove 223 formed in the sleeve wall. There is provided in the bottom of the groove 223 at least one, and preferably three, inlet openings 225, which are uniformly arranged on the sleeve circumference. Such an arrangement insures that the incoming, through the first channel 37, flow of oil is divided and, thus, does not impact on the stem 29 only from one side. Thereby, a sidewise displacement of the piston 15 is prevented which, otherwise, might have caused gaming of the piston 15 against the wall of the bore 9, which would have lead to a developing of high friction forces.

Providing three inlet openings 225 in the bottom of the groove 223 of the sleeve 219 insures uniform action of the incoming fluid flow on the stem 29, and no sidewise displacement of the piston 15 takes place.

The length of the sleeve 219 is so selected that it acts as a stop for the piston 15, with the outer edge 65 of the piston 15 engaging the sealing surface 221. When the sleeve 219 is formed as a separate part, it is so pressed into the bore 9 that it does not move away from the piston 15. Preferably, the length of the sleeve 219, when it is formed as a separate part, is so selected that, at its end remote from the piston 15, the sleeve 219 abuts the connection plug 23.

From the foregoing description, it follows that the embodiments of the valve assembly according to the present invention, which are shown in FIGS. 1–3, distinguish from each other only in how the seated valve is formed. It is possible to form the right end portion of the piston 15 conical in a manner shown in FIG. 4, with the conical surface running up the edge of the ring 19, 119 and, especially 219. It is also possible to provide both the piston 15 and the ring 19, 119, or 219 with abutting surfaces extending transverse to the axis 63. In contact area of the piston with the valve seat, there may be provided a sealing ring for enhancing the function of the seated valve.

It is further possible to provide the ring 19, 119, and, especially the sleeve 219, in the contact are with the piston 15, with a resilient annular portion, which, under pressure forces applied by the piston 15, would be deformed, providing an enhanced seat sealing.

The valve assembly, the embodiments of which are shown in FIGS. 1–3, operates as follows:

A fluid medium, e.g., oil, which is supplied by the discharge device, is delivered through the first channel 37 into the second bore portion 17 of the bore 9. Therefrom, the oil flows through the annular space between the stem 29 and the wall of the opening 27, into the interior 31 of the connection plug 23 and, therefrom, to the hydraulic actuator, e.g., a steering gear. Because the piston 15 is pressed against the sealing surface 21, 121, 221, which insures a reliable seat sealing, practically there is no leakage from the pressure space in the second bore portion 17 to the second channel 61. When the pressure in the second bore portion 17 increases, the piston 15 moves leftward against the biasing force of the spring, and the outer edge 65 of the piston 15 separates from the sealing surface 21, 121 or 221. Simultaneously, the cross-section of the free space between the stem 29 and the wall of the opening 27 diminishes. Thus, with an increased pressure in the second bore portion 17, which may be caused by an increased speed of the internal combustion engine which drives the steering pump, the fluid flow to the actuator can be reduced, from about 8 l/min to about 4 l/min. The increased speed of the internal combustion engine can be caused by applying an increased steering force to the steering wheel.

When the outer edge 65 of the piston 15 moves away from the sealing surface, the piston 15 opens the second channel 61 so that it is no more sealed from the first channel 37, and the fluid from the first channel 37 can flow into the second channel 61, which functions as a booster-channel. The size of the opening of the mouth of the channel 61 depends on the increase of pressure in the second bore portion 17. When the outer edge 65 of the piston 15 intersects the circular mouth of the second channel 61, a circular open region of the mouth is produced which insures a smooth control of the pressure in the second bore portion 17 and, thus, a good control stability.

In the closed position of the flow control valve 3, when the outer edge 65 of the piston 15 engages the sealing surface 21, 121, 221 of the seated valve, the control characteristics of the flow control valve 3 are those of a conventional slide valve.

As it has already been discussed, in the closed position of the flow control valve, there is practically no leakage from the first channel 37 to the second channel 61 and, thus, from the discharge side of the discharge device to the device suction side. The seated valve formed by the outer edge 65 and the sealing surface 21, 121, 221 insures a very high degree of sealing against leakage from the first channel 37 to the second channel 61.

The width of the ring 19, 119 is so selected that the ring 19, 119 does not block the mouth of the first channel 37. When the sealing surface is provided on the left end surface of a sleeve, the sealing surface 221 on the sleeve 219, which is Located in the second bore portion 17, the sleeve should be provided with a free passage communicating with the mouth of the first channel 37 and which should insure, on one hand, the application of pressure to the right side of the piston 15 and, on the other side, the flow of fluid into the interior 31 of the connection plug 23.

In all cases, it is possible to equip the discharge device with a sealing ring, preferably, with a sealing sleeve. To this end, it is sufficient to provide a recess in the second bore portion 17 of the bore 9. The connection plug 23 should have dimensions which insure reliable positioning thereof in the second bore portion 17.

Generally, the control characteristics of the flow control valve 3 should insure smooth and stable control, with minimum leakage of the working fluid.

The pressure, which prevails in the interior 31 of the connection plug 23, is transmitted to the pressure-limiting valve 5 through the channel 33 in the stem 29, the first bore portion 13, and the channel 43. The piston 15 is subjected from the right to the discharge pressure of the discharge device, and from the left, to the pressure at the inlet of the actuator. When pressure acting on the left side of the piston 15, that is the pressure in the first bore portion 13 exceeds a certain predetermined value, e.g., 100–110 bar, the pressure-limiting valve is actuated. That is, the closing body 53 moves against the biasing force of the spring 55 away from the mouth of the channel 51 in the abutment 49, and the pressure medium, oil, flows from the first bore portion 13 through channel 43 into the first pressure space 45, and therefrom through the channel 51 and past the closing body 53, into the second pressure chamber 57. From the chamber 57, the oil flows through outlet channel 59 to a reservoir or a suction side of the discharge device. Upon actuation of the pressure limiting valve 5, the pressure in the first bore portion 13, which acts on the left side of the piston 15, is further reduced, and the piston 15 can move further to the left upon increase in the system pressure. Thereby, the cross-sectional area, which provides from communication between the first and second channels 37 and 61, respectively, increases further preventing increase of pressure in the second bore portion 17.

The reduced cross-section of the orifice 33 prevents flow of too much oil into the first bore portion 13. The structure of the flow control valve 3 insures that the pressure equilibrium in the first and second bore portions 13 and 17 is achieved rather quickly, so that a predetermined outflow of fluid from th e first channel 37 to the second channel 61 is maintained constant. It the discharge pressure increases, the piston 15 moves further to the left, so that a larger area of the mouth of the channel 61 opens.

The structure of the valve assembly according to the present invention, especially the seated valve formed by the piston 15 and t he ring 19, 219 or the sleeve 219, insures retaining the control characteristic of a slide valve, without adverse influence thereon, and a minimal leakage in the region of the piston 15.

Another configuration of a seated valve will now be described with reference to FIG. 4.

Figure 4:
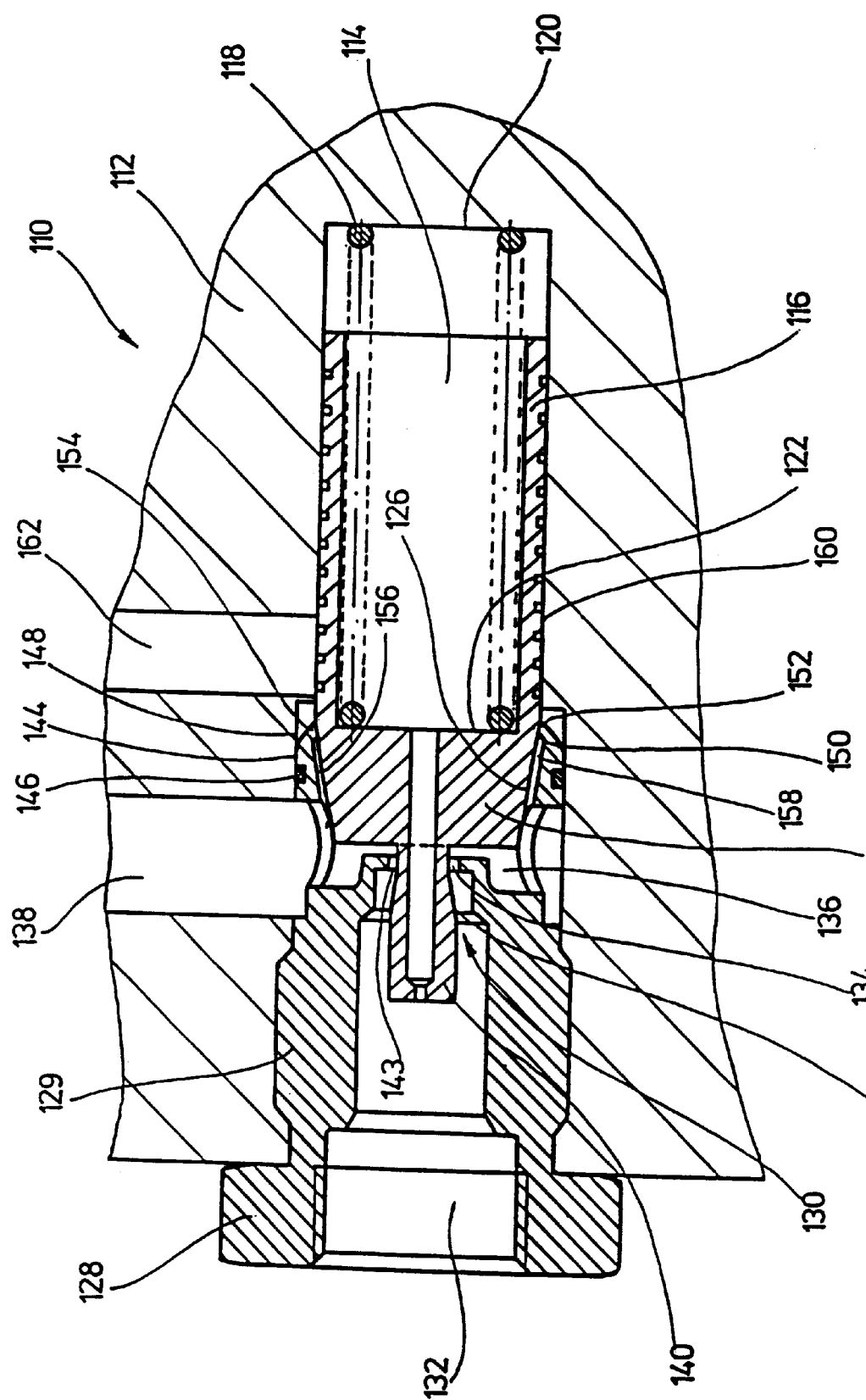
FIG. 4 is a longitudinal cross-sectional view of a fourth embodiment of the valve assembly according to the present invention.

The valve assembly shown in FIG. 4, comprises a flow control valve 110 located in an axial cavity 114 provided in the housing 112 of the discharge device. The flow control valve 110 comprises a piston 116, which is biased to its closed position by a spring 118. The spring 118 is supported between the bottom 120 of the axial cavity 114 and a surface 122 of the piston 116. The piston 116 has a conical end region 124, the conical surface 126 of which has a diameter increasing toward the rear of the piston 116. The cavity 114 is closed from the left with a plug 128, which is secured in the cavity 114 with a thread 129. The plug 128 is connected with a hydraulic actuator (not shown), e.g., a steering gear of a motor vehicle. The interior 132 of the plug 128 communicates through an opening 134 with an annular space 136 of the cavity 114. A first channel 138 communicates the annular space 136 with a discharge side of the discharge device (not shown), e.g., a steering pump. An extension 140 of the piston 116 projects through the opening 134. The portion of the extension 140, which is located in the interior 132 of the plug 128, has a conical portion the diameter of which increases toward the free end of the extension 140. The maximum diameter of the portion of the extension 140 is less than the diameter of the opening 134, whereby an annular passage 143 is provided. The annular passage 143 forms a metering orifice of a discharge throttle 130. The plug 128 further comprises an axial extension which forms a valve seat 144 which the portion 124 of the piston 116 engages. The valve seat 144 is sealed against the inner wall 148 of the cavity 114 by a seal 146. The valve seat 144 is provided with an inner annular shoulder 150 the edge 152 of which engages the outer surface 126 of the piston 116. The edge 152 and the surface 126 form together a valve seat arrangement. An annular space 158 is provided between the outer surface 126 and an inner surface 156 of the valve seat 144. In the shown embodiment, the surfaces 156 and 126 extend parallel to each other.

A second channel 162 communicates the interior 114 with a low pressure region, e.g., a reservoir of a steering pump. The channel 162 is blocked by a surface 160 of the piston 116. The piston 116 acts, with regard to channel 162, as a slide valve.

The valve assembly shown in FIG. 4 operates as follows:

Upon actuation of the discharge device, a predetermined pressure oil pressure is generated in the annular space 136. The pressure in the interior 132 of the plug 128 is determined by the size of the metering orifice 143. The pressure difference between the pressure in the annular space 136 and the pressure in the interior 132 acts on the piston 116 and causes its displacement against the biasing force of the spring 118. The displacement of the piston 116 results in opening of the channel 162. The size of the open area of the mouth of the channel 162 increases with an increased displacement of the piston 116 against the biasing force of the spring 118. With the displacement of the piston 116, a passage is created between the edge 152 of the valve seat 144 and the surface 126. By making the seating surface 126 conical, a linear dependence of an amount of fluid flowing into the channel 162 from the displacement of the piston 116 is provided. By changing the conicity of the surface 126, different linear characteristics from the same magnitude of the displacement of the piston 116 can be obtained. A corresponding selection of the inner surface 156 of the valve seat 144 permits to influence the flow force, that is, it can be reduced. Thus, in a simple manner, different linear discharge characteristics, which are independent from the speed of the discharge device, can be obtained. These characteristics can further be influenced by an appropriate selection of the discharge throttle 130.

While the present invention was shown and described with reference to the preferred embodiments, various modifications thereof will be apparent to those skilled in the art, and it is not intended that the invention be limited to the disclosed embodiments or details thereof, and departures may be made therefrom within the spirit and scope of the appended claims.

What is claimed is:

1. A valve assembly for a hydraulic discharge device including a housing having a bore, a first channel formed in the housing and having a mouth intersecting the bore, and a second channel formed in the housing and having a mouth intersecting the bore and spaced from the first channel mouth, said valve assembly comprising:

a piston located in the housing bore and having an outer surface which sealingly engages an inner wall of the housing bore, said outer surface having a section forming a seat valve, said piston being displaceable between a closed position, in which said seat valve engages a valve seat provided in said housing bore and the piston blocks the second channel mouth so that no fluid flows from the first channel into the second channel, and an open position, in which said seat valve is spaced from said valve seat and fluid can flow from the first channel into the second channel, and said piston functioning as a control slide of a flow control valve of the hydraulic discharge device;

means for biasing said piston to the closed position thereof; and means for enabling application of pressure to said piston for displacing said piston against a biasing force of said biasing means, wherein said seat valve has a control edge engaging said valve seat in the closed position of said piston, said valve seat having a sealing surface engageable by said control edge and having a first diameter, which is larger than a diameter of said piston, and a second diameter, which is smaller than the diameter of said piston.

2. A valve assembly as set forth in claim 1, wherein said valve seat defining means comprises a sealing ring located in the housing bore.

3. The valve assembly as set forth in claim 1, wherein said valve seat defining means comprises a sleeve located in the housing bore and defining said sealing surface, said sleeve having an inner space and means for communicating said inner space with the first channel mouth.

4. A valve assembly as set forth in claim 1, wherein said sealing surface is a part of a surface of a cone which opens toward the piston.

5. A valve assembly as set forth in claim 1, wherein said valve seat defining means comprises a ring having a sealing edge, and said piston has a conical end portion having an outer surface engageable with said sealing edge.

6. A valve assembly as set forth in claim 5, further comprising a plug for closing an end of the housing bore, remote from said piston, and having an extension projecting into an interior of the housing bore and forming said ring.

7. A valve assembly as set forth in claim 5, wherein said ring has a ring shoulder defining said inner edge.

8. A valve assembly as set forth in claim 5, wherein said ring has an inner surface, which, together with said outer surface of said conical end portion of said piston, defines an annular space.

9. A valve assembly as set forth in claim 8, wherein said inner surface and said outer surface extend parallel to each other.

10. A valve assembly as set forth in claim 8, wherein said inner surface and said outer surface extend at an angle to each other.

11. A valve assembly as set forth in claim 8, wherein said annular space has a variable cross-section in an axial direction.

12. A valve assembly as set forth in claim 11, wherein the variable cross-section of said annular space is formed by a varying diameter of said inner surface.

13. A valve assembly as set forth in claim 11, wherein the variable cross-section of said annular space is formed by a varying diameter of said outer surface.

14. The valve assembly according to claim 1 further comprising a pressure limiting valve which upon actuation reduces pressure in said first channel thereby reducing pressure on one side of said piston so that the said piston move further in a direction of said one side upon increasing system pressure and thereby preventing an increase in pressure on said second channel.

* * * * *

UNITED STATES PATENT AND TRADEMARK OFFICE
CERTIFICATE OF CORRECTION

| | | |
|---|---|---|
| PATENT NO. | : 6,263,909 B1 | Page 1 of 1 |
| DATED | : July 24, 2001 | |
| INVENTOR(S) | : Van Doan Nguyen, Yuejin Gong, Randolf Kortage, Hans Jurgen Lauth, Gerhard Overdiek, Willi Parsch and Thomas Nied-Menninger | |

It is certified that error appears in the above-identified patent and that said Letters Patent is hereby corrected as shown below:

<u>Title page,</u>
*Attorney, Agent or Firm*: Anderson, Kill & Olick, P.C.

Signed and Sealed this

Twenty-seventh Day of August, 2002

*Attest:*

JAMES E. ROGAN
*Attesting Officer*     *Director of the United States Patent and Trademark Office*